Figures 1, 2:
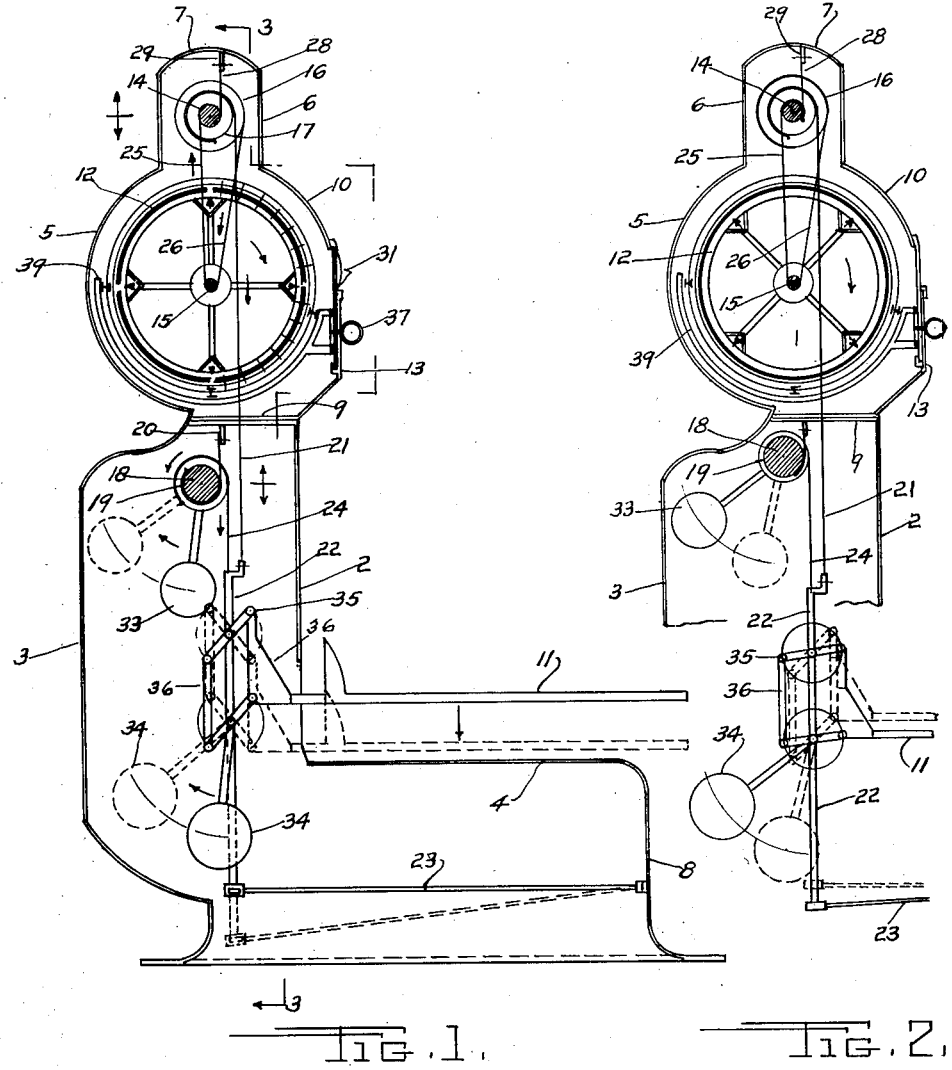

March 22, 1949. W. PATTERSON 2,465,330
WEIGHING AND CALCULATING SCALE
Filed June 5, 1946 3 Sheets-Sheet 1

William Patterson
INVENTOR.
BY Chas Denegre
Attorney

March 22, 1949.   W. PATTERSON   2,465,330
WEIGHING AND CALCULATING SCALE
Filed June 5, 1946   3 Sheets-Sheet 2
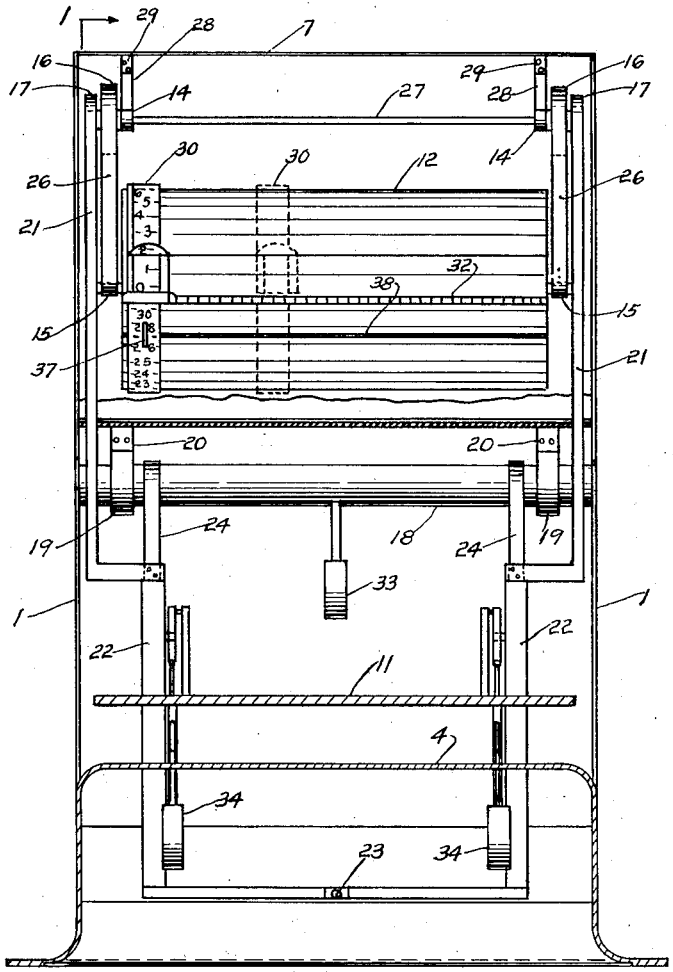
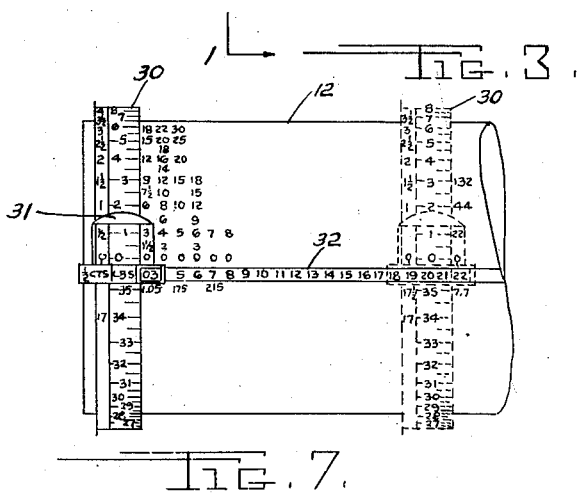
William Patterson
INVENTOR.
BY Chas. Denegre
Attorney March 22, 1949. W. PATTERSON 2,465,330
WEIGHING AND CALCULATING SCALE
Filed June 5, 1946 3 Sheets-Sheet 3

INVENTOR.
William Patterson
BY Chas. Denegre
Attorney

Patented Mar. 22, 1949

2,465,330

UNITED STATES PATENT OFFICE 2,465,330

WEIGHING AND CALCULATING SCALE

William Patterson, Birmingham, Ala.; Mamie Patterson, administratrix of said William Patterson, deceased, assignor of thirty-three and one-third per cent to Charles Denegre, Birmingham, Ala.

Application June 5, 1946, Serial No. 674,497

1 Claim. (Cl. 265—37)

This invention relates to a weighing and calculating scale. It has many advantages over scales now in general use based on economy in construction, efficiency and maintenance. Absolute accuracy is obtainable without the use of a lot of bearings and levers. The prevailing principle used in the structure is based on gravity employed through the means of metal bands that support the various parts of the assembly. The main objects are to provide an accurate scale free from springs and complicated parts liable to easily get out of order and cause trouble; also having calculating mechanism in combination with the weighing feature. Other advantages will appear from the drawing and description.

Figures 4, 5, 6:
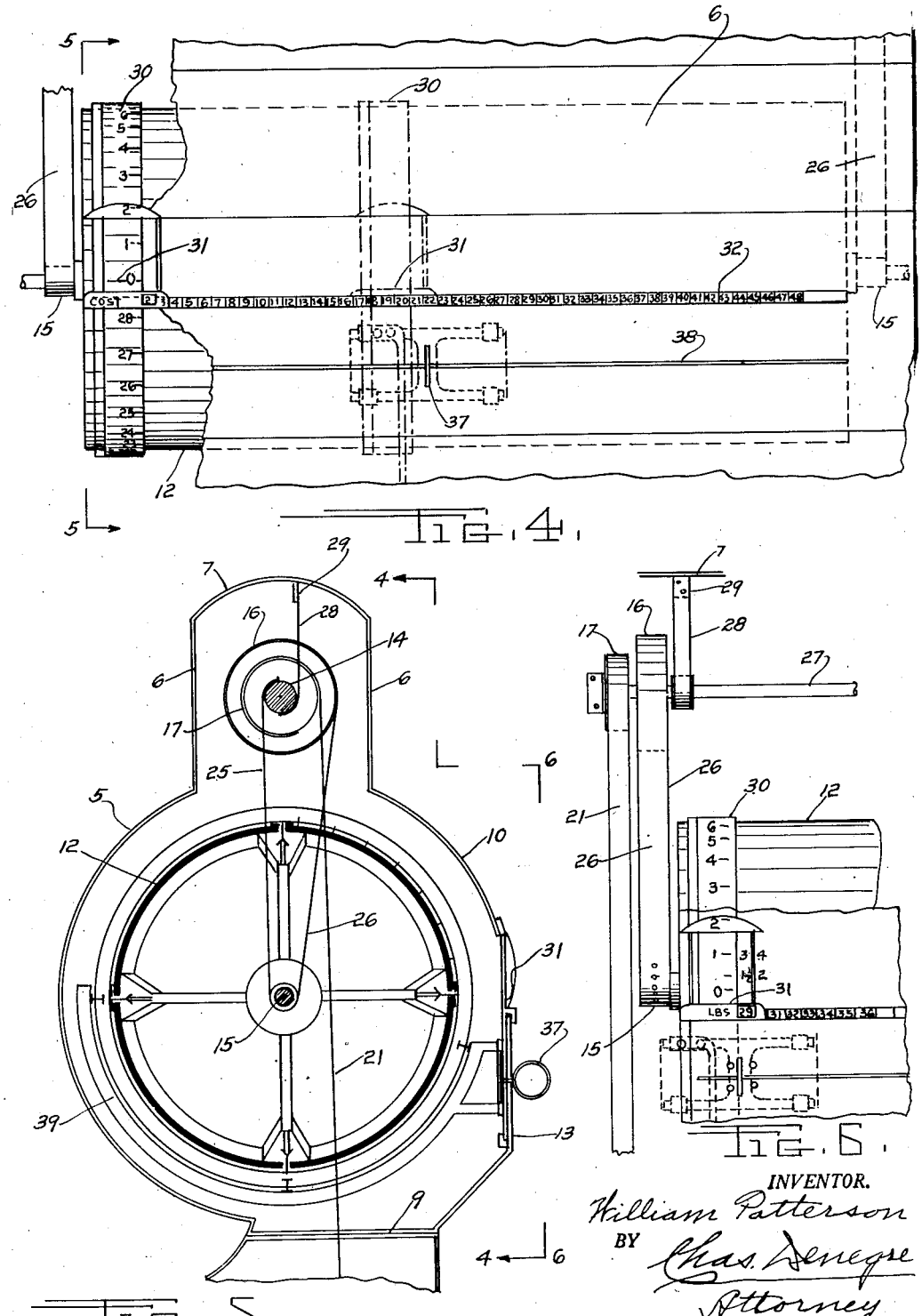

By referring to the drawings, part of this application, it will be observed that Fig. 1 is a side vertical sectional view of the scale on line 1—1 of Fig. 3; Fig. 2 is a side vertical sectional view showing the balancing members in another position from that shown in Fig. 1; Fig. 3 is a front cross sectional view on line 3—3 of Fig. 1; Fig. 4 is a partial front view on line 4—4 of Fig. 5; Fig. 5 is a cross sectional view on line 5—5 of Fig. 4; Fig. 6 is a partial front view on line 6—6 of Fig. 5; Fig. 7 is a detail view of the calculating mechanism of the scale.

Similar reference numerals refer to similar parts throughout the several views.

Referring to the drawings in detail it will be seen that the device comprises a main housing frame with sides 1, front 2, back 3, base 4, upper side portions 5, a cross top piece 7, and lower base front portion 8. Attached to the top piece 7 by brackets 29 are thin metal flexible bands 28 fixed to rollers 14 that are integral with their shaft 27. Also integral with the shaft 27 are rollers 16 and 17 with depending metal bands 25, 26 that loop around shaft ends 15 that carry the indicating drum 12. The bands where they loop around the shaft ends 15 or rollers integral with the shaft ends are provided with small holes that register with pins in the face of the shaft ends or rollers; or any other similar means may be used to prevent the bands from slipping around the shaft ends or rollers. The other ends of the bands 25, 26 are attached to rollers that are integral with the shaft 27. The bands 21 are attached to the rollers 17 that are integral with the shaft 27. The lower ends of bands 21 are attached to suspended members 22 that are maintained in alignment by swingable arms 23 in the base of the scale housing or frame. Mounted on the suspended members 22 are sets of cross levers 35 with connecting arms 36 to which assemblies the weighing platform 11 is attached and held in horizontal position. Across the middle portion of the frame there is a fixed member 9 that supports the metal bands 19 that are attached by their upper ends to brackets 20 with their other ends around and attached to roller shaft 18. Also attached to roller shaft 18 are metal bands 24 with their bottom ends fastened to the suspended members 22. Mounted on the roller shaft 18 is a balancing weight 33 that works in conjunction with similar weights 34 mounted on the cross lever and arm assemblies 35, 36.

The calculating drum 12 is provided with a casing 6, 10, 39, that also supports the sliding indicator 31 that is movable by its handle 37 in a slot 13 to different positions on the face of the drum 12 as indicated by 30. The slot window 32 shows the prices in conjunction with the numbers on the end of the drum. The vertical handle 37 and horizontal guide 38 are for accuracy in weighing and pricing at the same time by use of the figures on the face of the drum.

The rollers, shafts and metal bands of the device are to be of such sizes that they will accomplish coordination between the weighing of an article and the price per pound of same.

From the foregoing it will appear that when an article of weight is placed upon the platform of the scale it will pull downward on the bands that support the platform and also tend to throw the weighted levers outward toward the extreme positions as indicated by the dotted lines in Fig. 1. If the scale has a capacity of one hundred pounds the lever weights, cross levers and arms, and platform would be in the positions indicated by the dotted lines in Fig. 1. Also when an article of weight is placed upon the platform the metal bands connected to rollers above the calculating drum would cause partial revolving motion that would in turn revolve the drum. The entire scale may be made of any material best suited for the purpose, but I prefer to use such materials that are generally used in the manufacture of scales.

While I have shown and described the preferred embodiment of my invention, I do not wish to limit same to the exact and precise details of structure, but reserve the right to make all modifications and changes so long as I remain within the spirit and scope of the following claim.

Having described my invention I claim:

A weighing scale of the class described comprising; a framed housing, a cross top member as part of the housing, metal bands attached to the top member and depending therefrom, a floating shaft with integral rollers, the lower ends of the metal bands partly surrounding and attached to the rollers, a second set of bands partly surrounding the integral rollers on the floating shaft; an indicating drum positioned below the said floating shaft with integral rollers, a roller on a shaft on each end of said drum, said second set of bands attached to and depending from the floating shaft looped around the rollers on the drum shaft ends, holes in the metal band portions that surround the drum shaft rollers, pins in the drum shaft rollers adapted to register into the said holes in the bands, weight and price numerals on the face of said drum and coordinated to figure a given weight and price, a slidable indicator mounted on the housing adjacent the front of said drum; a fixed cross member attached in the housing below the drum, metal bands attached to said fixed member and depending therefrom, a second floating shaft with integral rollers positioned below the fixed cross member, the lower ends of the bands depending from the cross member attached to and partly around rollers on said second floating shaft, metal bands with their top ends partly around and attached to said second floating shaft, the lower ends of the same bands attached to vertical members, two bands with their top ends attached to rollers on the top floating shaft with their lower ends attached to said vertical members; an integral weight and arm attached to said lower floating shaft, cross levers and arms attached to said vertical members, an integral weight and arm attached to each of said cross levers and arms assemblies, a weighing platform attached to and suspended by said vertical members that carry the integral weights and arms.

WILLIAM PATTERSON.

REFERENCES CITED

The following references are of record in the file of this patent:

FOREIGN PATENTS

| Number | Country | Date |
|---|---|---|
| 201,383 | Great Britain | Aug. 2, 1923 |
| 292,934 | Great Britain | Sept. 12, 1929 |